United States Patent [19]

Bunn et al.

[11] Patent Number: 5,393,540
[45] Date of Patent: Feb. 28, 1995

[54] AUTOMATIC BEVERAGE BREWING METHOD

[75] Inventors: Arthur H. Bunn, Springfield; James H. Anson, Auburn; David F. Ford, Springfield, all of Ill.

[73] Assignee: Bunn-O-Matic Corporation, Springfield, Ill.

[21] Appl. No.: 142,609

[22] Filed: Oct. 25, 1993

Related U.S. Application Data

[60] Division of Ser. No. 1,468, Jan. 7, 1993, Pat. No. 5,303,639, which is a continuation-in-part of Ser. No. 946,960, Sep. 17, 1992, Pat. No. 5,230,278, which is a continuation-in-part of Ser. No. 818,850, Jan. 10, 1992, Pat. No. 5,255,593, which is a continuation-in-part of Ser. No. 683,285, Apr. 10, 1991, Pat. No. 5,134,925.

[51] Int. Cl.⁶ .................................................. A23F 5/00
[52] U.S. Cl. ...................................... 426/231; 426/433
[58] Field of Search ............. 426/231, 433; 99/289 R, 99/300

[56] References Cited

U.S. PATENT DOCUMENTS

| | | |
|---|---|---|
| 2,800,152 | 7/1957 | Sloier . |
| 3,253,534 | 7/1963 | Ross et al. . |
| 3,288,049 | 11/1966 | Schmid et al. . |
| 3,576,646 | 4/1971 | Alwood ........................ 426/231 |
| 4,633,771 | 1/1987 | Anderl . |
| 4,651,632 | 3/1987 | Motsch . |
| 4,694,737 | 9/1987 | Wittlinger . |
| 4,703,686 | 11/1987 | Siegfried . |
| 5,112,629 | 5/1992 | Antonini ........................ 426/231 |
| 5,134,925 | 8/1992 | Bunn et al. . |
| 5,158,793 | 10/1992 | Helbling ........................ 426/231 |

Primary Examiner—George Yeung
Attorney, Agent, or Firm—Trexler, Bushnell, Giangiorgi & Blackstone, Ltd.

[57] ABSTRACT

An automatic beverage brewing apparatus which includes a brew chamber having an inlet and an outlet and a water distribution system associated with the brew chamber for introducing brew water and flush water. A filter assembly is disposed in the brew chamber and has an opening formed therethrough for communicating with the outlet of the brew chamber. A piston assembly disposed in the brew chamber including a spool and a device for controllably moving the spool in axial and rotary directions. The spool includes a head, a base, and a necked portion extending between the head and the base. The spool is disposed in the brew chamber with the head controllably movable in the inlet and the base controllably movable in the outlet for controllably opening and plugging the inlet and outlet. A port associated with a flush water dispenser is formed through an exterior surface of the spool between the head and the necked portion. The invention also provides an apparatus and a method for producing large quantities of a desired brewed beverage. Multiple substance dispensers are provided to selectively combine a variety of substances to produce a desired brewed beverage. Heated water is conserved by the present invention by providing a control valve on the inlet line at the lower portion of the heated water reservoir.

8 Claims, 7 Drawing Sheets

Fig. 7
Fig. 8
Fig. 9
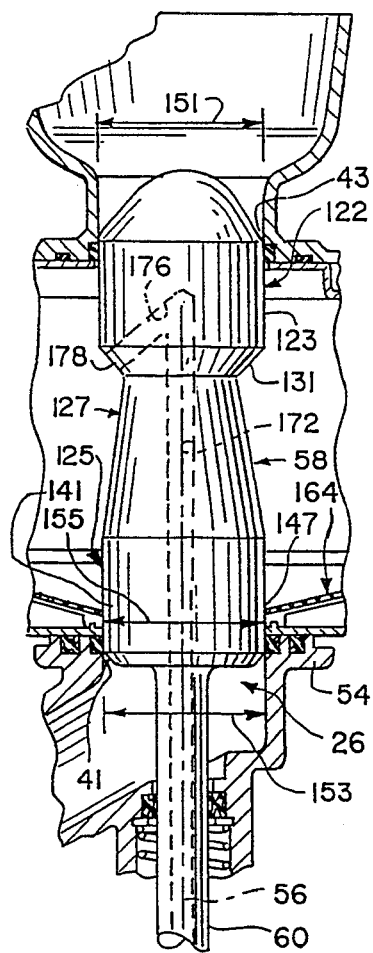
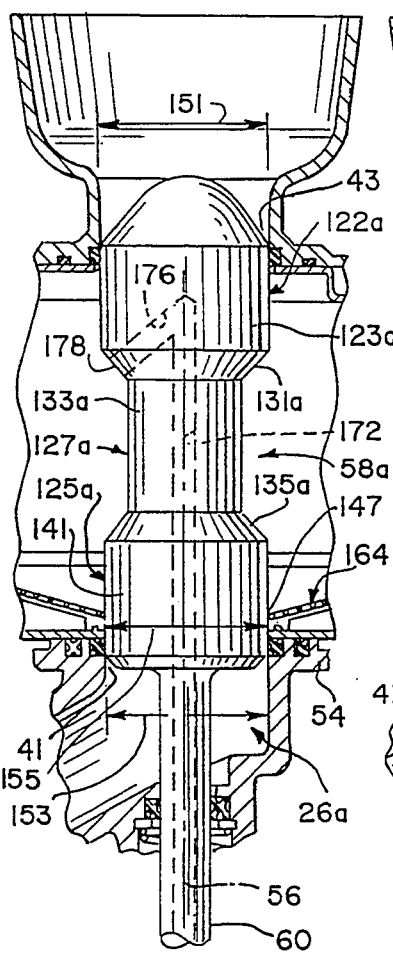
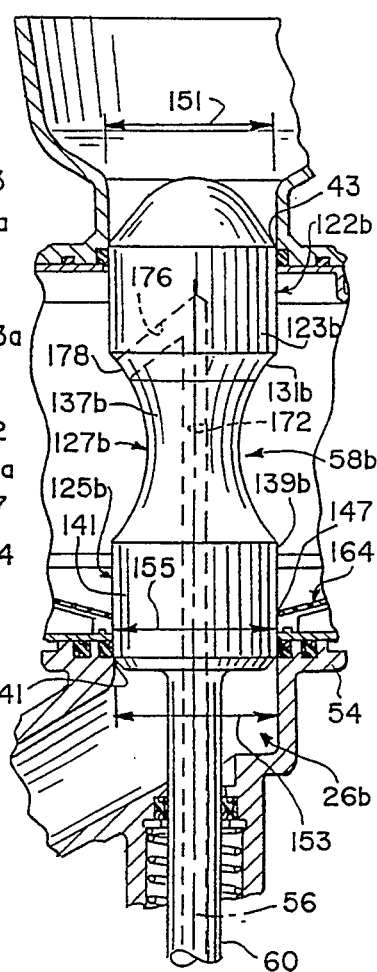

AUTOMATIC BEVERAGE BREWING METHOD

CROSS-REFERENCE TO RELATED APPLICATION

This is a Divisional of application Ser. No. 08/001,468, filed on Jan. 7, 1993, now U.S. Pat. No. 5,303,639, which is a continuation-in-part of patent application Ser. No. 07/946,960, filed Sep. 17, 1992, now U.S. Pat. No. 5,230,278, which is a continuation-in-part of patent application Ser. No. 07/818,850, filed Jan. 10, 1992, now U.S. Pat. No. 5,255,593, which is a continuation-in-part of patent application Ser. No. 07/683,285, filed Apr. 10, 1991, now U.S. Pat. No. 5,134,925.

BACKGROUND AND SUMMARY OF THE INVENTION

This invention relates generally to an improved beverage brewing device which automates many of the steps involved in a beverage brewing operation.

Automatic brewing devices are known in the art but have not overcome many of the problems associated with such devices. For example, U.S. Pat. No. 4,633,771 to Anderl shows an automatic brewing device which incorporates a movable piston to regulate the brewing cycle. The piston as shown in Anderl is axially moved by a rod which is driven by a motor. The rod advances or retreats based on its engagement with a rotating cam disk. A problem arises with the device of Anderl in that the notches in the cam disc are prone to cause improper brewing if they become coated or clogged with foreign matter. Foreign matter is likely to accumulate on the disc because of the environment in which it operates which includes fines and powder from the beverage brewing substance as well as high humidity from the brewing process.

Another problem with the device as shown in Anderl is that it is difficult to keep the brewing chamber clean and to exhaust spent brewing substance. Anderl shows only a single spray head which proves inefficient and is not thorough in flushing spent brewing substance from the brew chamber.

Another automatic brewing device is shown in U.S. Pat. No. 4,694,737 to Wittlinger. The device as shown in Wittlinger is similar in its operation to the device in Anderl but does not provide improvements resolving the problems of Anderl. Rather, the device in Wittlinger shows improvements to the filtering assembly as used in the brew chamber.

Another problem with known automatic brewing devices is that they are capable of brewing only small quantities of beverage. The devices shown in the references cited herein indicate brewing small quantities of beverage such as a single serving or single carafe. The typical arrangement of the structure of the brewing apparatus provides space below a dispensing spout which is sufficient to accommodate a predetermined carafe size. Such a space may also accommodate a single serving, since a single serving container will have dimensions smaller than a multiple serving carafe. However, large capacity remote reservoirs with one or two gallon capacities are unable to receive brewed beverage due to the dimensions of such reservoirs which are proportioned to accommodate large volumes.

It would desirable to provide an automatic beverage brewing device which would be capable of selectively dispensing a large range of quantities of brewed beverage to an appropriately sized container. For example, it is desirable to be able to brew a single cup, as well as a carafe, as well as a large capacity (1-2 gallon) volume of brewed beverage using the same automatic brewing device. It is not desirable, however, to provide a beverage brewing device which has a single spout which will accommodate the largest size since such accommodation may result in a beverage brewing device which does not neatly and precisely dispense brewed beverage to smaller capacity containers.

Another problem that arises with automatic beverage brewers is that although they are generally automatic they nevertheless require periodic cleaning. Periodic cleanings include removing a filter assembly disposed in a lower portion of the brewing chamber. The filter assembly is used to support a brewing substance for infusion during a brewing cycle and to separate a brewed beverage created during the brewing cycle. A problem is encountered in cleaning prior art filter assemblies when the piston assembly includes a spool having an enlarged head. A lower portion of the spool movably extends through the drain with the enlarged head movably extending through an inlet in a top portion of the brewed chamber. A port used for delivering flush water is positioned underneath the head between the head and a reduced diameter portion of the spool. The lower portion of the spool is surrounded by a filter assembly which has an aperture through which the lower portion of the spool projects. Since the lower portion of the spool has a smaller diameter than the enlarged head, the filter assembly cannot be installed or removed by positioning it over the enlarged head. As such, removal of the filter assembly in these devices typically requires removal of the piston assembly.

Another problem with prior automatic brewing devices is that once the brewing substance becomes saturated during the brewing process it sinks to the bottom of the brewing chamber. As the brewed beverage is drained off of the brewing substance the moist brewing substance may become caked on and plug the openings in the filter material. At the end of the brewing cycle the brewing chamber is flushed, typically with a spray of water, in order to remove the spent brewing substance. However, because the brewing substance may be caked on the filter material in the drained brewing chamber the rinse water spray does not completely flush the spent brewing substance out of the brewing chamber. Instead, a portion of the spent substance remains in the brewing chamber on the filter material. The remaining substance inhibits flow of brewed beverage through the filter material and thereby reduces the efficiency of the brewer. Further, depending on the time between brewing cycles, the brewing substance remaining on the filter material may become rancid and degrade the flavor of the next serving of beverage to be brewed.

Additionally, another problem with current automatic brewing devices is that the mechanism for dispensing a brewing substance into the brew chamber is inaccurate. One way to controllably dispense a brewing substance into the brew chamber is by means of an auger in a hopper. The auger is positioned in the bottom of a hopper in an operative association with an opening in the hopper through which the brewing substance is moved. However, such auger arrangements are often inaccurate and tend to dispense too much brewing substance.

OBJECTS AND SUMMARY OF THE INVENTION

A general object of the present invention is to provide an automatic beverage brewing device which accommodates a wide range of brewing capacities.

A more specific object of the present invention is to provide an automatic beverage brewing device which provides means for selectively dispensing brewed beverages to a large volume container independent of means for dispensing brewed beverage to smaller volume containers.

Another general object of the present invention is to provide an improved automatic beverage brewing device which thoroughly and efficiently removes spent beverage brewing substances from a brew chamber at the completion of a brewing cycle.

Another object of the present invention is to provide an automatic beverage brewing device which permits removal of a filter assembly without having to remove or disassemble the piston assembly.

Another object of the present invention is to provide an automatic beverage brewing device which has an enlarged drain opening.

Another object of the present invention is to provide a brewing substance dispenser in combination with the present invention which dispenses a precise quantity of brewing substance.

Another object of the present invention is to provide an automatic beverage brewing apparatus which rinses a beverage brewing substance from a receiving funnel to assure complete use of the fresh beverage brewing substance and thorough cleaning of the components of the beverage brewing apparatus.

A further object of the present invention is to provide a preliminary floating of the beverage brewing substance prior to brewing.

Another object of the present invention is to provide a beverage brewing apparatus for automatically brewing beverages which generally evenly distributes brew water over a beverage brewing substance to more thoroughly and efficiently extract a brewed beverage therefrom.

Still another object of the present invention is to provide a floating phase of a cleaning cycle to remove the brewing substance from the filter material.

Yet another object of the present invention is to provide a beverage brewing apparatus for automatically brewing beverages which thoroughly removes spent beverage brewing substance from a brew chamber by employing a spray head mounted in a spool member extending through the brew chamber thereby thoroughly removing spent brewing substance from all parts of the brew chamber.

Still a further object of the present invention is to provide a beverage brewing apparatus for automatically brewing beverages which include a rotatable piston and a spray head mounted thereon for rotatably spraying and removing beverage brewing substances from the brew chamber.

Briefly, and in accordance with the foregoing, the present invention comprises an automatic brewing apparatus for automatically brewing beverages such as coffee. The apparatus includes a brewing chamber assembly with a throat in a top portion, a drain in a bottom portion, and a filter positioned therebetween. A movable piston assembly is provided to controllably open and close the throat and drain during brewing and flushing cycles. A separate discharge line directs brewed beverage from the brew chamber to a receiving container. A valve is provided along the discharge line to control the filling of the brewing chamber, to controllably dispense a brewed beverage from the brewing chamber, and to prevent flush water from flowing through a dispensing branch of the discharge line.

At the initiation of the brewing cycle the piston is moved downwardly to open the throat to permit the introduction of brewing substance into the chamber. A pressurized water line rinses the throat through which the brewing substance is introduced into the brewing chamber. Additionally, water is introduced through a water distribution manifold to expedite the initial partial filling of the brewing chamber. Water initially introduced into the chamber is used to float the brewing substance permitting saturation and steeping of the brewing substance. The piston is moved upwardly so that the drain and the throat are closed during the steeping step. After sufficient steeping time the discharge valve on the discharge line, which is normally deenergized, is energized to open a path through the dispensing branch to direct the flow of brewed beverage into a collection container. The discharge valve is also energized to close the path to the drain sump. After dispensing the brewed beverage, the discharge valve is positioned to close both the dispensing and the drain paths.

After the brewing cycle is complete a flushing cycle begins to flush the spent brewing substance out of the brewing chamber. The valve on the discharge line blocks the discharge line to retain water in the brewing chamber for floating the spent brewing substance in order to float it off of the filter material. Upon floating the brewing substance, the piston is moved upwardly to drain the float water and the spent brewing substance carried thereon. Next, the piston is moved downwardly to close the drain and water is introduced through a spray opening in the piston. The piston is rapidly rotated to spray down the sides of the chamber and to create a swirling motion in the water which has accumulated in the chamber. At a predetermined time the piston is moved to open the drain and flush the swirling water from the chamber while the piston continues to rotate.

The piston assembly includes a spool which has a head, a base, and a necked portion extending between the head and the base. The spool is disposed in the brew chamber assembly with the head controllably movable through the throat and the base controllably movable through the drain. The spool controllably opens and plugs the throat and the drain. The filter assembly has an aperture formed therethrough through which the base of the spool projects. The head and the base of the spool have an external dimension which is less than or substantially equal to an inside dimension of the aperture formed through the filter assembly with the head having an external dimension which is smaller than or substantially equal to an external dimension of the base. The size and the dimension of the head and base allow the filter assembly to be installed or removed over the spool without removing the spool from the brew chamber assembly.

The brewing apparatus is programmable to control: the level of prefill water, steeping time, brewing temperature, volume of brew water used, and amount of beverage brewed. The brewing chamber may be pressurized during the brewing process.

The apparatus also includes a brewing substance dispenser which is controlled to dispense a precise predetermined quantity of brewing substance.

The invention also provides a structure and method to produce large quantities of a desired brewed beverage. Multiple substance dispensers are provided to selectively combine a variety of substances to produce a desired brewed beverage. Heated water is conserved by the present invention by providing a control valve on the inlet line at the lower portion of the heated water reservoir.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements in which:

FIG. 7 is a partial fragmentary side cross-sectional view of a spool employed in the present invention extending through an aperture formed through a filter assembly, a drain formed through a bottom portion of the brew chamber assembly, and a throat formed through a top portion of the brew chamber assembly;

FIG. 8 is a first alternate embodiment of the spool of the piston assembly;

FIG. 9 is a second alternate embodiment of the spool of the piston assembly of the present invention;

DETAILED DESCRIPTION OF THE PREFERRED EMBODIMENT

Figure 1:
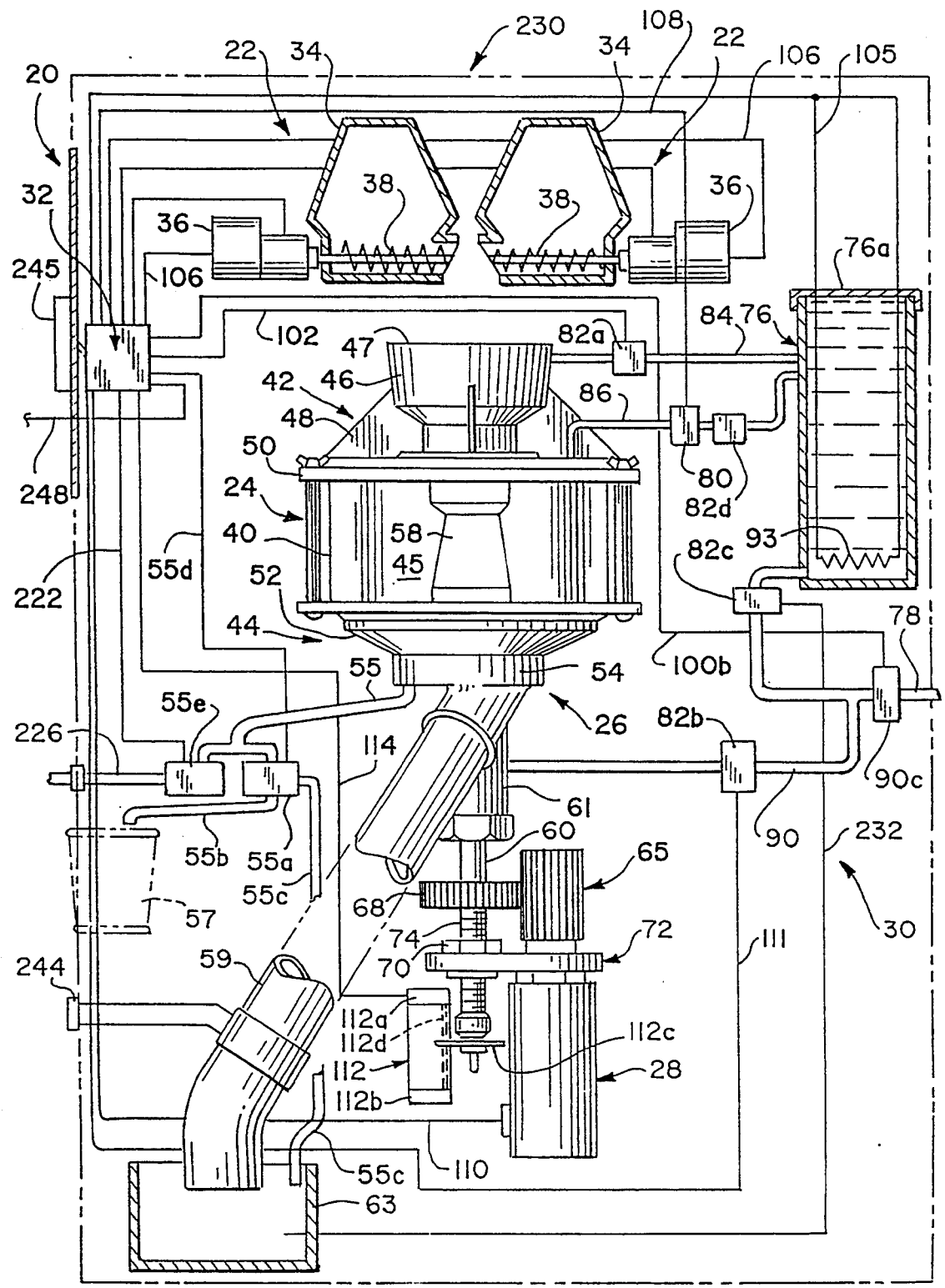
FIG. 1 is a diagrammatic illustration of a beverage brewing apparatus of the present invention.

While the invention may be susceptible to embodiment in different forms, there is shown in the drawings, and will be described in detail, a specific embodiment with the understanding that the present disclosure is to be considered an exemplification of the principles of the invention, and is not intended to limit the invention to that as illustrated and described herein.

Referring now to the drawings, wherein like parts are designated by the same reference numerals throughout the figures, an automatic beverage brewing apparatus or brewer 20 is diagrammatically illustrated in FIG. 1. The brewer 20 includes a hopper assembly 22, a brew chamber assembly 24, a piston assembly 26 (as better shown in FIGS. 2–5), a drive means or apparatus 28, a water distribution system 30 and a control system 32.

As shown in FIG. 1, the hopper assembly 22 includes a hopper container 34 and a motor 36 driven auger 38 retained therein. A brewing substance such as coffee is disposed inside the hopper container 34 and stored therein for controlled delivery to the brew chamber assembly 24. While the word "coffee" may be used herein with regard to the beverage brewing substance, it should be clear that brewing substances other than coffee may be used in the present invention. Further, although a hopper assembly 22 is shown, a grinding apparatus (not shown) may be added to deliver a predetermined quantity of freshly ground coffee or other beverage brewing substance to the brew chamber assembly 24.

The brew chamber assembly 24 includes a housing member 40 which is retained between a chamber top assembly 42 and a chamber bottom assembly 44. The housing member 40 is a generally cylindrical member formed of a suitable material to withstand the temperature, moisture and other conditions present during the brewing process. As shown herein, the housing member 40 is formed of a suitable transparent material such as glass to permit inspection of the brew chamber assembly 24 without disassembly thereof. As can be seen in FIG. 1, the piston assembly 26 projects upwardly through a drain hole 41, the chamber bottom assembly 44, the housing member 40, and through an inlet throat 43 in the chamber top assembly 42. A brew chamber 45 is defined by the inside surface of the housing member 40 when the top and bottom chamber assemblies 42, 44 are attached thereto.

A funnel portion 46 is mounted on the uppermost portion of the chamber top assembly 42 having top and bottom openings 47a,47b coaxial with said inlet throat 43 and is reinforced by support members 48 extending from the sides thereof. A spray manifold assembly 50 is positioned between the funnel portion 46 and the housing member 40.

The chamber bottom assembly 44 includes a filter assembly 52 and a drain body 54. With further reference to FIGS. 2–7, the filter assembly 52 helps to separate out a brewed beverage 53 created during the brewing process from water infused brewing substance 53a. A discharge line 55 extends from the filter assembly 52 to a pair of discharge valves 55a,55e which are controllable to direct flow through a dispensing line 55b, through a waste line 55c, to prevent flow through either line 55b,55c, or to direct flow through a large quantity discharge line 226. The dispensing line 55b delivers a brewed beverage 53 collected from the brew chamber to a container 57. The waste line 55c delivers waste water to the waste sump 63. Spent grounds are transported though an exhaust tube 59 and deposited in the waste sump 63 therebelow.

The other controllable valve 55e is positioned along the discharge line 55 as discussed hereinabove. The controllable valve 55e is connected to the control system or means for selectively controlling 32 via line 222. The controllable valve 55e controllably directs flow from the discharge line 55 into the large quantity discharge line 226. When the controllable valves 55a,55e are controlled to dispense flow from the discharge line 55 into the dispensing line 55b, the controllable valve 55e is closed and the controllable valve 55a is opened. When the flow through the discharge line 55 is controlled by the controllable valves 55a,55e to flow through the large quantity line 226, the flow exits the brewing apparatus for delivery to a remote beverage container 236 (See, FIGS. 10–12). Various aspects of the structure and function of the remote brewing capabilities will be discussed in greater detail further hereinbelow.

The discharge valve 55a includes a separate solenoid valve for the dispensing line 55b and the waste line 55c. The solenoids in the valve 55a are normally deenergized with the path to the waste line 55c open to allow drainage to the waste sump 63 and the path to the dispensing line 55b closed. The valve 55a is selectively energized to open the dispensing line 55b and close the waste line 55c, or to close both lines 55b,55c.

The controllable valve 55e includes a solenoid valve similar to the discharge valve 55a to controllably direct flow through the large quantity discharge line 226. The solenoid of the controllable valve 55e is normally deenergized such that the valve is closed. In this condition, the path to the large quantity discharge line 226 closed. The controllable valve 55e is selectively energized to open the large quantity discharge line 226. Valve 55e controls line 226 and valve 55a controls the path to line 55b. Solenoid valve 55e and 55a are controlled for preventing both paths 226,55b, respectively, from being open at the same time. More details regarding the remote beverage dispensing features of the present invention will be presented hereinbelow.

As indicated above, the piston assembly 26 projects upwardly through the bottom of the brew chamber assembly 24 along a central axis 56 extending therethrough. Included in the piston assembly 26 is a spool portion 58 generally positioned inside of the housing member 40, and a shank portion 60 attached to and extending downwardly from the spool portion 58.

The drive apparatus 28 includes a lead screw 62 which attaches to the shank portion 60 of the piston assembly 26 to operatively connect the drive apparatus 28 with the piston assembly 26. A motor 64 associated with the drive apparatus 28 moves the gears 65 to rotate and axially displace the lead screw 62 and the attached piston assembly. The motor 64 is preferably a DC motor which may be reversed to reverse the direction of rotation and travel of the piston assembly 26.

While various forms of the gears 65 may be employed to drive the lead screw 62, the driving means 65 as illustrated includes a driving gear 66 engaged with an operating gear 68, both of these gears 66, 68 being cooperatively mating spur gears, and an acme nut 70 attached to a fixed mounting member 72. Fixing the acme nut 70 to the mounting member 72 retains the acme nut 70 in a fixed position relative to the driving gear 66 to produce movement in the lead screw 62. Threads 74 of the lead screw 62 cooperatively engage threads formed on the inside of the acme nut 70. The operating gear 68 is nonrotatably fixed to the lead screw 62 so that when the driving gear 66 is rotated the operating gear 68 is rotated thereby rotating the lead screw 62. As the lead screw 62 is rotated, it threadedly moves through the acme nut 70 resulting in axial displacement of the piston assembly 26 through the brew chamber assembly 24. Further, since the operating gear 68 is fixed to the lead screw 62 the piston assembly 26 also rotates as it is axially displaced through the brew chamber assembly 24.

A heated water reservoir 76 and a cold water inlet line 78 supply water to the water distribution system 30. The heated water reservoir 76 has a sealed top 76a to withstand the incoming water pressure from the inlet line 78. Water flowing from the heated water reservoir 76 and the cold water inlet line 78 are controlled by a respective brew water solenoid valve 80, a rinse water solenoid valve 82a, and a flush water valve 82b. Water flowing into the reservoir 76 through the reservoir fill line 88 is quickly heated as it passes over a heating element 93 which is located near the point where the reservoir fill line enters the reservoir 76.

A pressure regulator 90c regulates the line pressure on the inlet line 78 such that water flowing to a reservoir fill line 88 and a flush water line 90 is at a predetermined pressure. A flow control valve 82d on the brew water line 86 is positioned between the reservoir 76 and the brew water valve 80 to control the rate of water flow through the brew water line 86.

The brew water valve 80 controls the water flowing from the heated water reservoir 26 which is caused to flow by water being introduced into the reservoir 26 displacing the heated water therein, which displaced water flows through a brew line 86. The brew water line 86 provides brew water to the spray manifold assembly 50 which then evenly distributes the brew water over the beverage brewing substance 53a. The flush water line 90 supplies water to the piston assembly 26 which thereby introduces water into the brew chamber 45 to flush spent beverage brewing substance from the brew chamber 45. The rinse water line 84 emits a controlled amount of pressurized heated water to the funnel portion 46 to rinse any beverage brewing substance 53a from the inside of the funnel 46 and into the brew chamber 24.

The automatic beverage brewer 20 is controlled by the control system 32. The control system 32 includes a central controller 96 which coordinates control signals between it and the components of the brewer 20 over numerous control lines. The control lines are shown diagrammatically as single lines but may include multi-wire lines depending on the requirements of the particular component. The apparatus, as disclosed herein, may be adjusted to brew a range of quantities of brewed beverage and may be adjusted to deliver a larger or smaller quantity of beverage to a carafe or other container, not shown, from which the beverage can be subsequently dispensed. Additionally, the controller 96 is programmable to control: the level of prefill water dispensed into the brewing chamber; the period of time during which infused brewing substance is steeped; brewing water temperature; the volume of brew water used for a predetermined quantity of brewing substance and the volume of brewed substance dispensed through the dispensing line.

The hopper assembly 22 includes the hopper motor 36 which is controlled by the controller 96 over the line 106, a hopper container 34, and the auger 38 which extends through the hopper container 34 and is driven by the motor 36. The hopper motor 36 is controlled by a triac and a microprocessor (not shown) of known construction. The microprocessor turns the triac on and off to control the hopper motor 36. The microprocessor applies 120 VAC to the motor 36 when the motor 36 is to operate to drive the auger 38 to deliver a quantity of brewing substance to the brew chamber 24. In order to stop the motor 36 the microprocessor determines when the waveform across the motor 36 is of one polarity. When the polarity is sensed, the microprocessor turns on the triac only when the AC waveform is of the same polarity. For example the microprocessor senses when the voltage across the motor windings is always + to − and then turns on the triac. Thus, the motor 36 is driven with a direct current and produces a braking action on the motor 36. As the braking action is over very small periods of time, the microprocessor may be set to deliver precise quantities of brewing substances 53a from the hopper container 34 to the brewing chamber 24.

The present invention also includes means 230 for selectively combining two or more substances for brewing, flavoring and mixing a brewed beverage. The combining means 230 includes a plurality of controllable substance dispensers or hopper assemblies 22 which are positioned to communicate with the brew chamber 24 by dispensing a desired substance into the funnel 47 leading into the brewing chamber 24. Each of the plurality of substance dispenser 22 includes the hopper motor 36, controller 96 over control lines. The substance dispensers 22 further include the hopper container 34 in conjunction with the auger 38 extending through the hopper container 34 and driven by the motor 36 in accordance with the details provided hereinabove. The selectively controlling means 32 controls the plurality of controllable dispensers 22 for dispensing a predetermined quantity of a selected type of substance from at least two of the controllable dispensers 22 for producing a predetermined selected beverage.

An example for selectively combining two or more substances while brewing may include dispensing an appropriate beverage brewing substance in combination with a sweetening or flavoring additive. The user selects a desired resultant beverage at the control means 32 which then activates the controllable substance dispensers 22 to dispense an appropriate quantity of substance from the respective hopper containers 34 to achieve the desired resulted beverage.

To provide a more specific illustration of the selectively combining means 230, the present invention may be used to produce a sweetened cafe mocha. Cafe mocha includes coffee, a cocoa substance, and a sweetening substance. In this case, at least three controllable substance dispensers 22 are required for this application. In use, the user selects the desired beverage, in this case sweetened cafe mocha, at the control means 32. The control means then activates each of the three controllable dispensers 22 to dispense the appropriate quantity of substance therefrom. A first substance dispenser 22 is activated to dispense a desired quantity of coffee meal into the brew chamber 24. A second substance dispenser 22 is activated to dispense an appropriate quantity of cocoa into the brew chamber 24. Finally, a third substance dispenser 22 is activated to dispense an appropriate quantity of sweetening additive such as sugar or an artificial sugar. Another example would be if a user desires sweetened mocha with a touch of another spice such as cinnamon. The procedure described hereinabove would be carried out but an additional substance dispenser 22 would be provided which would contain cinnamon and an appropriate quantity of cinnamon would be dispensed into the brewing chamber 24 upon selection of the desired beverage.

It is clear that a series of substance dispensers 22 can be arranged to deliver appropriate quantities of desired substances to the brew chamber for brewing, flavoring and mixing a desired brewed beverage.

Figure 6:
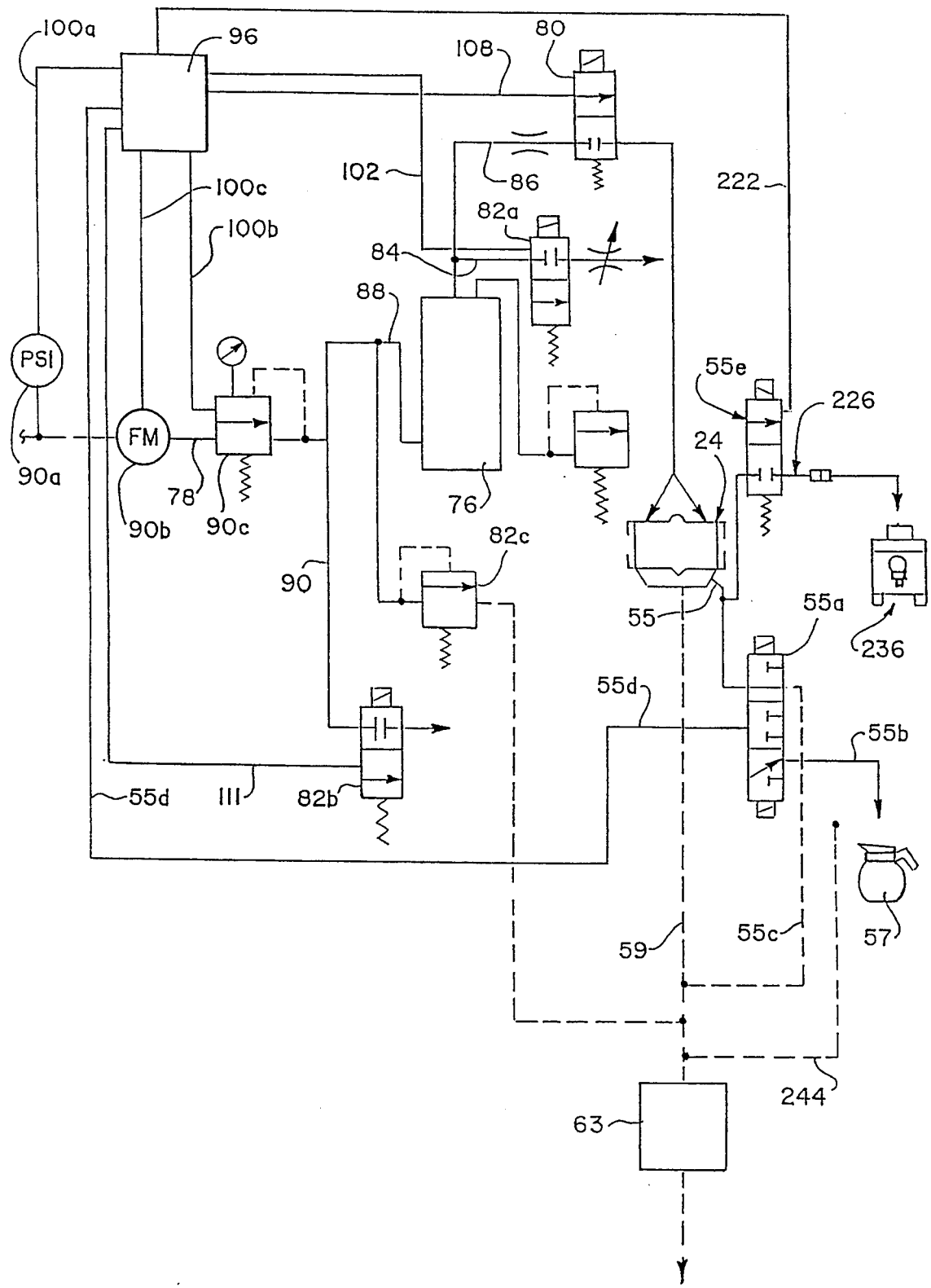
FIG. 6 is a general hydraulic schematic diagram of the present invention.

FIG. 1 provides a diagrammatic representation of the hydraulic and electrical organization of the present invention. FIG. 6 provides a schematic diagram of the water flow circuit, including the electrical control lines 108,102,111 interconnected between the controller 96 and the control valves 80,82a,82b, respectively.

Since the inlet line 78 is constantly open and imposing inflowing water pressure on the reservoir 76, the reservoir is constantly topped-off even when not in use. Such topping off maintains the reservoir 76 in a filled condition and ready to brew upon demand at any time.

An additional feature of the present invention is the ability to conserve heated water in the reservoir 76. While the inlet line 78 is constantly open and imposing inflowing water pressure on the reservoir 76, the reservoir also develops a certain degree of pressure caused by heating and subsequent expansion of water retained in the reservoir 76. As the cool water enters the bottom of the reservoir, the heating element 93 heats the water which causes heated water to rise toward the top of the reservoir 76 and cooler water to remain towards the bottom of the reservoir 76. The control valves 80,82,82a,82b prevent expansion of water in the reservoir into any of the lines which they control. A pressure relief valve 82c is provided on the cold water line 88 such that expanding water from the reservoir 76 which is at a pressure in excess of a predetermined reservoir pressure is released through the relief valve 82c and is drained into the collection sump 63 through drain line 232. By relieving excessive pressure through the bottom of the reservoir 76, the heated water towards the top of the reservoir 76 is conserved thereby conserving the energy and the time required to heat the reservoir water.

The rinse water solenoid valve 82a is controlled over line 102 to control flow through the rinse water line 84 for providing controlled pressurized water flow to the funnel portion 46 to rinse any brewing substance 53a off of the funnel 46. After a quantity of brewing substance 53a is dispensed by the hopper assembly 22, the controller 96 signals the rinse water valve 82a and brew water valve 80 over lines 102,108, respectively, to open and allow water to flow through the rinse water line 84 and the brew water line 86. The water dispensed from the rinse line 84 by the valve 82a rinses the funnel 46 and then collects in the brew chamber 45 making up part of the water which is used to float the brewing substance before the brewing water is dispensed. The water from the brew water line 86 provides additional water to float the brewing substance. Both sources of water 84,86 are utilized so as to expedite the step of dispensing float water into the brewing chamber 45. After a predetermined period of time the controller 96 signals the rinse water and brew water valves 82a,80 to close thereby terminating the flow of water into the brew chamber 45.

Since the controller may be programmed for a steep time, there may be a period of time between dispensing the float water and dispensing additional brew water. At the appropriate time, for example after the preset steep time, the controller 96 signals the brew water valve 80 over line 108 to open and allow water to flow through the brew line 86. Water flows through the inlet line 78 simultaneous therewith to introduce non-heated water into the bottom of the reservoir 76 thereby displacing the heated water in the reservoir 76 upwardly an out through the brew line 86. With the brew water valve 80 opened, water flows through the brew line 86 an into the brewing chamber 45 for infusion with the brewing substance. At the end of the brew water dispensing cycle the controller 96 signals the brew water valve 80 to close thereby ceasing the flow of brew water into the brewing chamber 45.

As further shown in FIG. 6, a pressure switch 90a is provided on the inlet line 78 and is connected with the controller 96 via line 100a. The pressure switch 90a may be calibrated to a predetermined pressure setting so that a prespecified minimum pressure level must be developed in the inlet line 78 for the apparatus 20 to operate. This pressure switch 90a prevents back pressure and improper brewing.

A flow meter 90b is used to measure the amount of water the apparatus is using during each brewing cycle and is in communication with the controller 96 via line 100c. A primary pressure regulator 90c maintains the inlet line 78 at a consistent predetermined pressure level, for example 20 p.s.i. dynamic. The primary pressure regulator 90c establishes and assures a consistent working water pressure for the entire hydraulic circuit.

The heated water reservoir 76 also includes the thermostatically controlled heating element 93 which is controlled over control line 105 by a thermostatic device of known construction.

In summary, when operation of the brewer 20 is activated by switch means 104 the controller 96 activates the discharge valve 55a to close the waste line 55c. The controller 96 activates the motor 36 through control line 106 to measure out a predetermined amount of beverage brewing substance 53a from the hopper assembly 22 into the funnel portion 46. A plurality of substance dispensers 22 can be provided to dispense a variety of substances into the brewing chamber 24 to achieve a predetermined desired mix to a resulted brewed beverage.

After a predetermined amount of beverage brewing substance 53a has been dispensed into the funnel portion 46, the controller 96 activates the rinse water valve 82a, the brew water valve 80 for a predetermined period of time over control lines 102,108, respectively, to introduce rinse water through the rinse water line 84 into the funnel portion 46 and to quickly prefill the brewing chamber. At the end of dispensing prefill or float water, the controller 96 may allow the brewing substance to steep for a predetermined period of time. At the end of the steep time, the controller 96 opens the brew water valve 80 to dispense brew water into the brew chamber which results from water flowing through the inlet line and into the heated water reservoir 76 to displace heated water thereby introducing brew water into the brew chamber 45 through the brew line 86.

Figure 10:
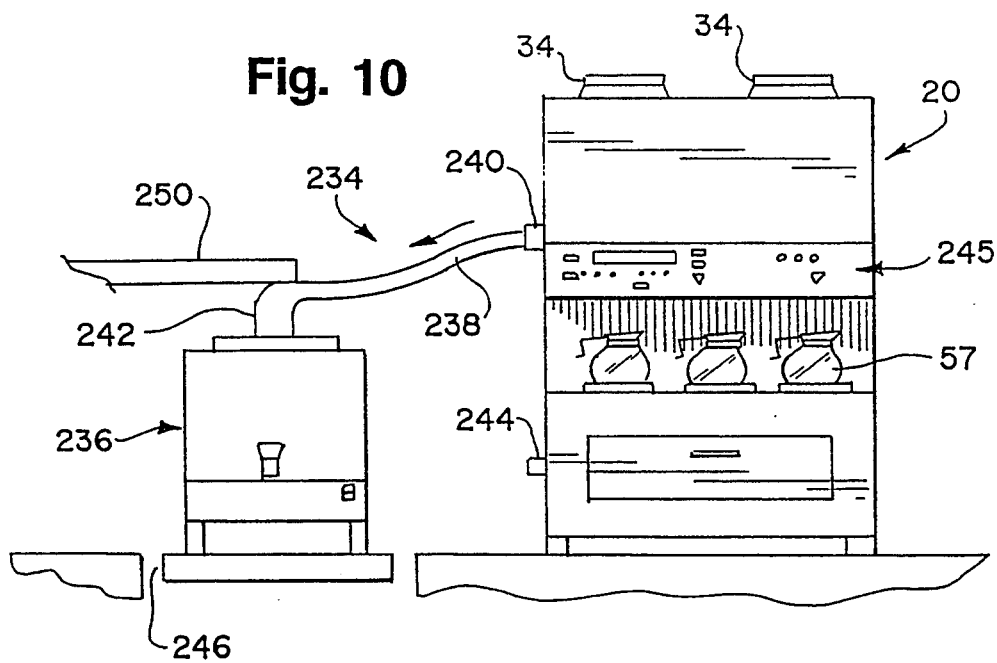
FIG. 10 is a diagrammatic representation of an beverage brewing device which is connected by means for providing a beverage path to a remote beverage container.
Figure 12:
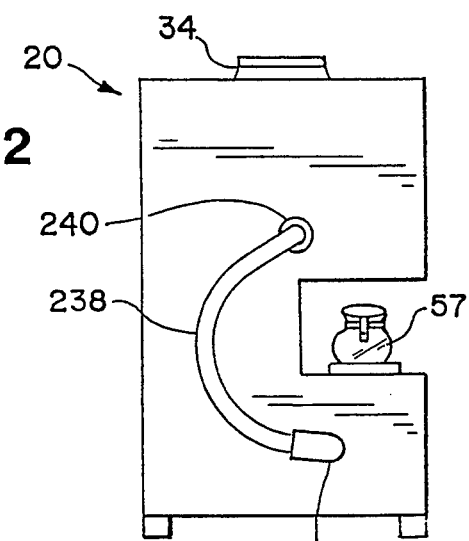
FIG. 12 is a left side view of the beverage brewing device as shown in FIG. 10 in which a hose of the beverage path means is connected to a first end and a second end of the beverage brewing device.
Figure 11:
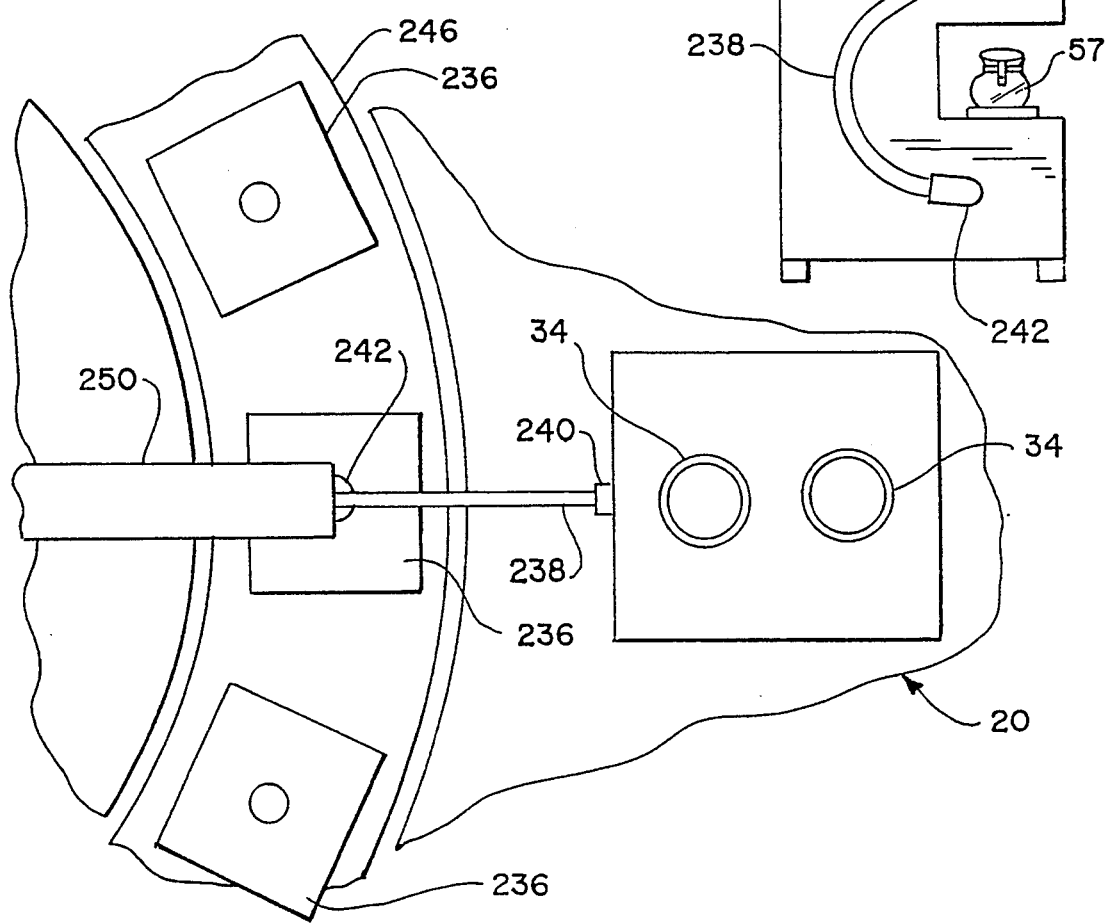
FIG. 11 is a plan view of the device as shown in FIG. 10 in which the beverage brewing device is connected to the remote beverage container.

The present invention also provides the ability to brew large quantities of brewed beverage thereby eliminating the need to brew multiple smaller quantities of a desired beverage. With reference to FIGS. 10, 11, and 12, the automatic beverage brewing apparatus 20 can be connected by means 234 for providing a beverage path to dispense a desired brewed beverage to a remote beverage container 236. The remote beverage container 236 provides a receptacle for large quantities of brewed beverage produced in the brewing chamber 24.

It should be noted that the brewing chamber 24 as shown in the present invention may be capable of producing upwards of a gallon or more of brewed beverage. Additionally, since the present invention is highly automated, multiple brewing cycles can be employed to produce quantities of brewed beverage greater than a quantity which would be produced by a single brewing cycle using a maximum amount of brewing substance in the brewing chamber 24.

The ability to brew beverage and dispense the beverage to a remote container 236 provides the ability to increase the utilization of the beverage brewer beyond the capacity of just the vessels or containers 57 which are positionable in the brewing apparatus 20 itself. This ability is especially important to large volume users which may need to transport brewed beverage to a variety of locations yet are not capable of providing an individual beverage brewing apparatus at each location.

The means 234 for providing a beverage path includes a dispensing hose or line 238 having a first end 240 which is removably attached to the automatic beverage brewing apparatus 20 and receives a brewed beverage through the large quantity discharge line 226. A second end 242 is removably couplable with the remote beverage container 236. The second end 242 includes a quickly releasable coupling of a known design to provide coupling and decoupling without the use of tools and which also provides a stop valve or non-drip valve when the couple is disconnected.

As shown in FIG. 12, the dispensing line 238 can be connected to a drain conduit 244 (See FIG. 1) which is connected to the primary drain line 59. This feature allows the dispensing line 238 to be connected to the drain conduit 244 so that fluid or material passing through the dispensing line 238 drains into the drain conduit 244 and therefore the primary drain line 59. The dispensing line as shown in FIGS. 10, 11 and 12, has a hose having a length dimension such that gravity induced positive drainage is provided between the first end 240 and the second end 242 when the second end 242 is attached to the drain conduit 244. The quickly releasable coupling on the second end 242 of the dispensing line 238 also provides the advantage of quickly coupling and decoupling when attaching to the free end of the drain conduit 244.

The remote beverage container capability of the present invention may be used in a manual capacity such that a user disconnects the hose 238 from the drain conduit 244 and connects it to a remote beverage container 236. After selecting a desired brewed substance and a desired quantity on a control panel 245 which is coupled to the controller 96, a desired quantity of the brewed beverage is dispensed into the beverage container 236. The controller 96 includes a microprocessor which is pre-programmed and programmable to operate the apparatus 20 through one or more brewing cycles of a selected brewing substance to achieve a desired brewed beverage. The user selects a beverage type and a quantity whereupon the programming in the microprocessor carries out the functions and operates the apparatus 20 to produce the desired quantity of the selected beverage.

The remote brewing capabilities can also be used in a more highly automated capacity such that the present invention also provides for a means for controllably indexing 246 a series of remote beverage containers 236. The means for indexing 246 is coupled to the controller 96 by control line 248. The means for indexing 246 is a moving device of known design which is capable of moving objects in either a rotary or linear path as well as a horizontal or vertical direction. The driving mechanism of the means for indexing 246 is coupled to the controller 96. The programming in the microprocessor in the controller 96 provides commands to operate the means for indexing 246. The commands from the controller 96 incrementally index a remote beverage container 236 into position for receiving a brewed beverage from the apparatus 20 upon receiving an appropriate command during a brewing cycle.

The present invention also provides means for controllably connecting and disconnecting 250 the second end 242 of the dispensing line 238 to the remote beverage container 236. The means for connecting and disconnecting 250 is a controllable placing mechanism such as a simplified robotic arm of a known design. The means for controllably connecting and disconnecting 250 also receives commands from the controller 96 such that the programming in the microprocessor of the controller 96 activates and controls the means for controllably connecting and disconnecting 250.

When the controller 96 commands the indexing means 246 to position a remote container 236 in position for receiving a brewed beverage, the controller 96 also commands the means for controllably connecting and disconnecting 250 to connect the second end 242 to the remote container 236. The means for controllably connecting and disconnecting 250 is fitted with an attachment to which the second end 242 is attached. In this way, the means for controllably connecting and disconnecting 250 merely needs to lift up or push down on the end 242 to properly position it with respect to a remote beverage container 236 positioned therebelow. FIG. 11 provides a plan view of the elevational view as shown in FIG. 10.

In use, the user selects a type of beverage to be brewed and a desired quantity of the beverage. The user selects the quantity and type of beverage by means of the control panel 245 which is connected to the controller 96. The controller 96 includes the microprocessor and programming to control the means for indexing 246 and the means for controllably connecting and disconnecting 250 the second end 242 of the dispensing line 238.

When the brewing cycle is started, the controller 96 indexes a remote container 236 in position below the coupling 242 whereupon the means for controllably connecting and disconnecting 250 attaches the coupling 242 to the remote container 236 after a predetermined quantity of beverage is dispensed into the remote container 236, the means for controllably connecting and disconnecting 250 may be signaled to disconnect the coupling 242 from the container 236. At this point, the controller 96 may control the indexing means 246 to index another remote container 236 into position below the coupling 242. The cycle of indexing and connecting and disconnecting as well as dispensing a brewed beverage is repeated for as many cycles as is required to achieve the preselected quantity of the predetermined type of brewed beverage as selected by the user on the control panel 245.

The drive apparatus 28 is also controlled by the central controller 96 by means of a power control line 110 and an optical sensor 112 (as shown in FIG. 1) associated with the central controller 96 by control line 114. Movement of the components of the drive apparatus 28 are regulated by signals generated by the optical sensor 112. The sensor 112 employs a light transmitter device 112a and a receiver device 112b and a disk 112c. The disk 112c is attached to the end of the lead screw 62 between the transmitter 112a and the receiver 112b. A number of holes (not shown) having predetermined spacing therebetween are formed through the disk 112c to permit the light (as represented by dotted line 112d) from the transmitter 112a to pass therethrough. When light 112d passes through the holes the receiver 112b senses the light 112d, essentially in the form of "on" and "off" signals indicating the number of holes that have passed the beam path, and sends a signal over line 114 to the controller 96. The controller 96 uses the signals from the receiver 112b to control the drive apparatus 28.

Figure 3:
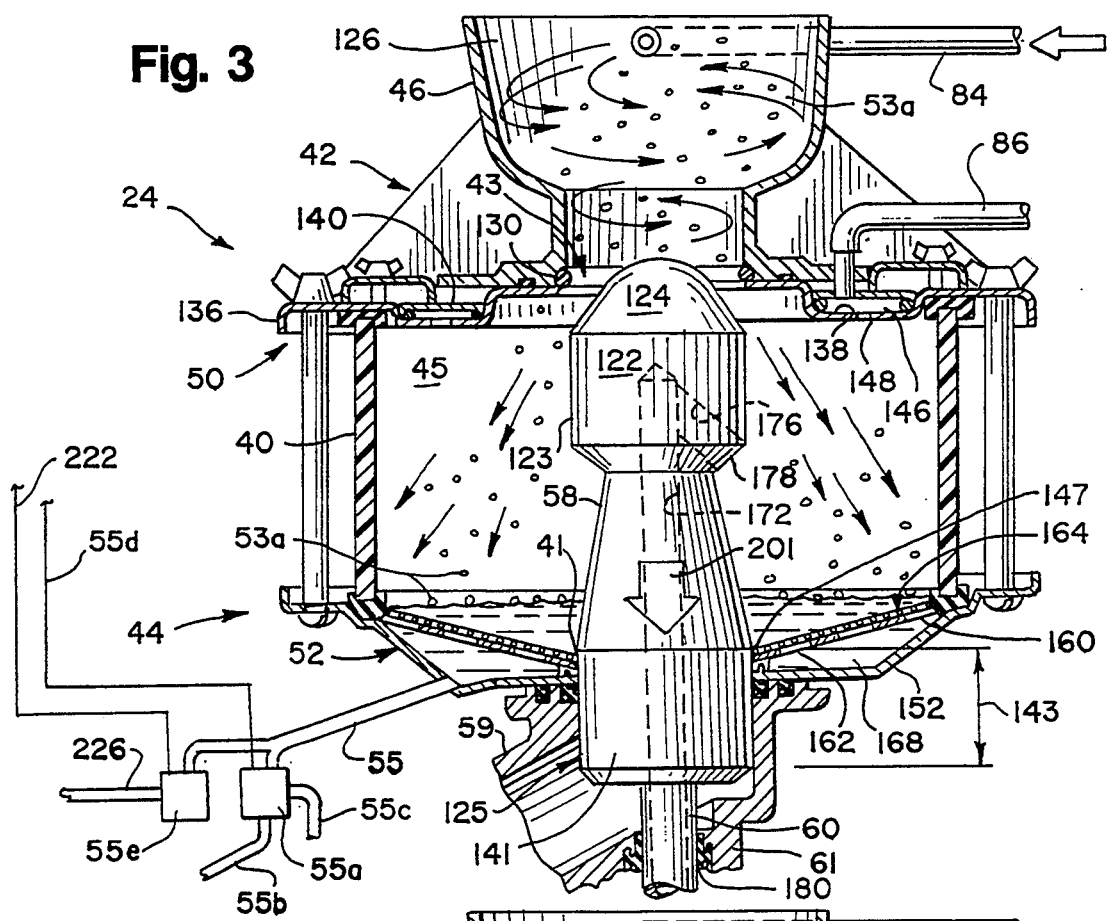
FIG. 3 is a partial fragmentary cross sectional side elevational view of the brew chamber assembly as illustrated in FIG. 2 after a piston assembly projecting therethrough is downwardly axially displaced from an inlet throat and illustrating a beverage brewing substance being disposed therein through a funnel member and preliminary fill water being introduced to rinse the funnel and initially float the brewing substance in the brewing chamber.
Figure 4:
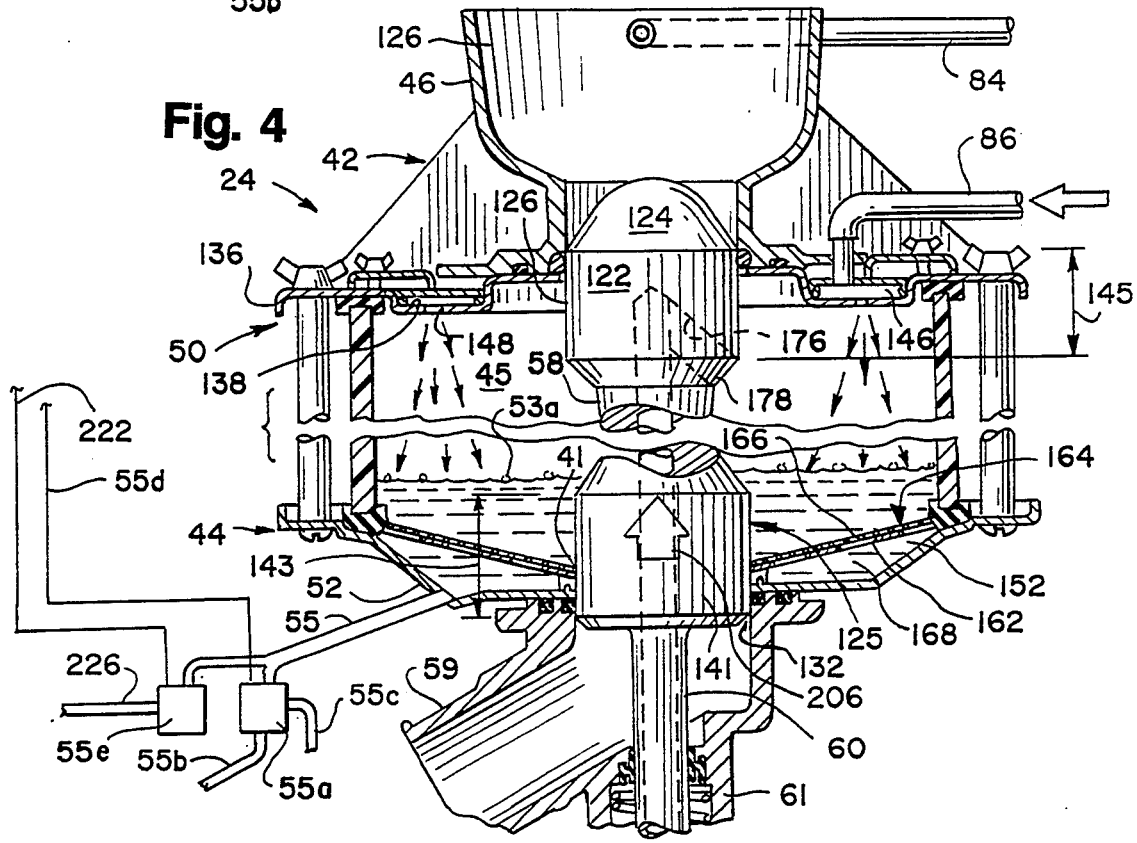
FIG. 4. is a partial fragmentary cross sectional side elevational view of the brew chamber assembly after the piston assembly is upwardly axially displaced to seal the inlet throat and illustrating brew water flowing into the brew chamber for infusing the brewing substance disposed therein.
Figure 5:
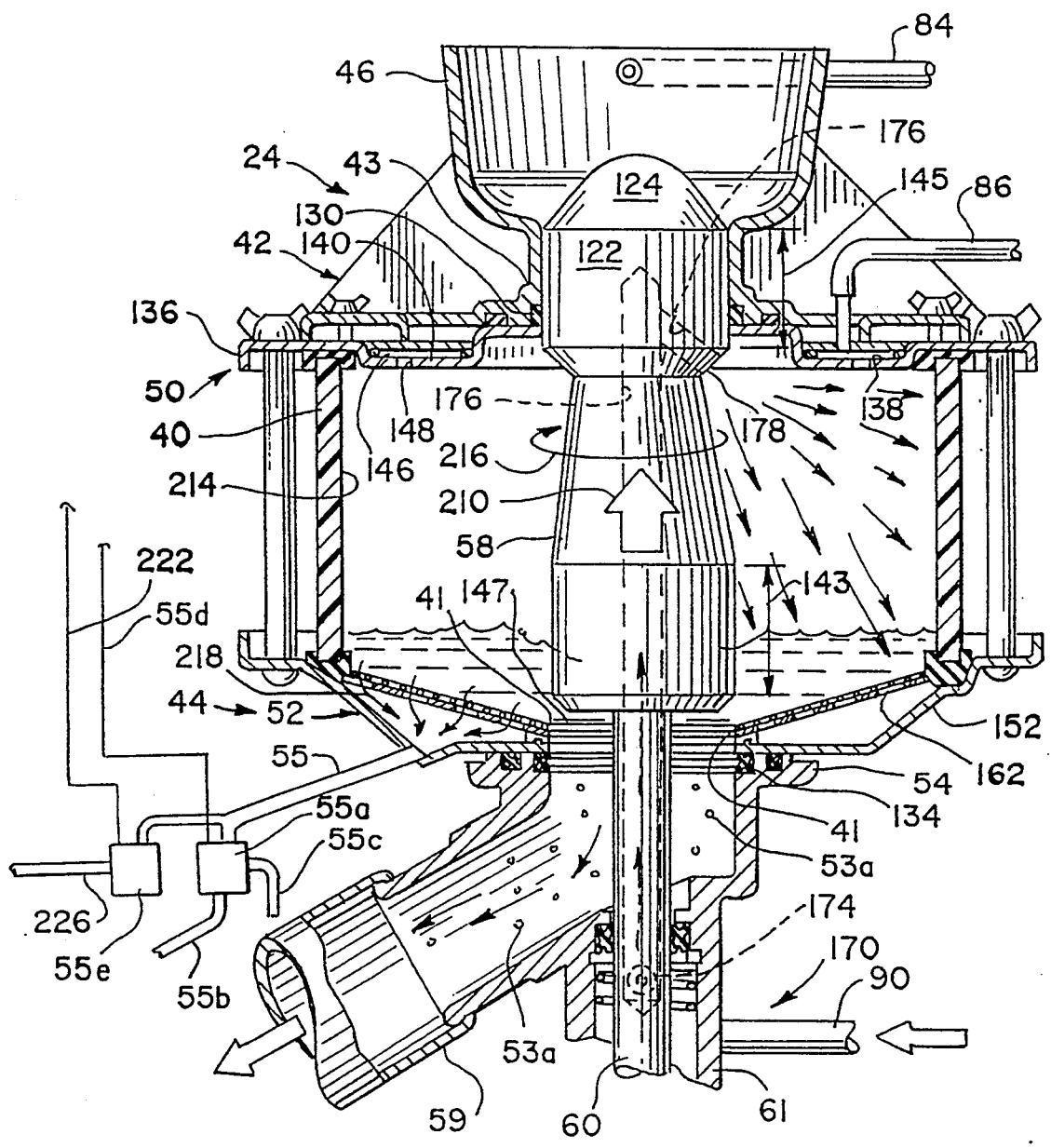
FIG. 5. is a partial fragmentary cross sectional side elevational view of the brew chamber assembly after the piston assembly is upwardly axially displaced and further illustrating rotary movement of the piston assembly spraying the inside of the brew chamber to exhaust spent brewing substance.

The piston assembly 26 includes the spool 58 and a shank portion 60 extending therefrom. As discussed hereinabove, the piston assembly 26 also includes means for controllably moving the spool 28. As shown in FIGS. 1–5 and 7–9, the spool 58 includes a head 122 which terminates in a domed surface 124, a base 125, and a necked portion 127. FIGS. 7, 8, and 9 show three different embodiments of the spool 58,58a,58b of the present invention. Regardless of the embodiment, the spool 58 is disposed in the brew chamber with the head 122 controllably movable in the inlet 43 and the base controllably movable in the outlet 41. As Shown in FIG. 5, an outside surface 123 of the head 122 projecting through the inlet 43 seals against a gasket 130 retained in the inlet 43. Similarly, a gasket 134 positioned inside the outlet 41 seals the base when positioned in the outlet 41. The outlet 41 communicates with the drain body 54.

With reference to FIG. 7, the head 122 also includes an undercut portion 131 formed between the head 122 and the necked portion 127. The necked portion extends from the base 125 upwardly and slightly inwardly towards the undercut portion 131. The embodiment of the necked portion 127 as shown in FIG. 7 has a frusto-conical shape. The combination of the undercut portion 131 and the necked portion 127 provides a concealed location for a port 178 formed in an outer surface of the undercut portion 131. The port 178 connects to a bore 176 of the water distribution system.

With reference to FIGS. 8 and 9, portions of the embodiment shown therein which are substantially similar or are identical to the embodiment as shown in FIG. 7 will use the same reference numeral with the addition of a suffix added thereto. For example, such numbers used in FIG. 8 will include a "a" suffix while the reference numerals employed in FIG. 9 will use a "b" suffix.

As shown in FIG. 8 a first alternate embodiment of a spool 58a as employed in the present invention is shown therein. The head 122a includes an undercut portion 131a, a base portion 125a and a necked portion 127a. A first segment 133a of the necked portion 127a includes an exterior surface which is substantially parallel to the central axis 56. A second portion 135a of the necked portion 127a extends radially outwardly from the first portion 133a to the base 125a defining a frusto-conical surface.

With reference to FIG. 9, the necked portion 127b extending between the head 122b and the base 125b has an exterior surface 137b which defines a continuously curving concave surface. The curvature of the necked portion 127b as shown in FIG. 9 begins at an uppermost portion 139b of the base 125b and curves upwardly towards the undercut portion 131b.

Once again, regardless of the embodiment of the spool 58,58a,58b as presented in the drawings (See FIGS. 7, 8 and 9), the head 122 and the base 125 are sized and dimensioned to perform controllable opening and sealing functions during the brewing process. With reference to FIGS. 3 and 4, an exterior surface 141 of the base 125 has a dimension 143 which maintains the outlet in a sealed condition over a predetermined range of travel of the spool 58 within the brew chamber. Similarly, with reference to FIGS. 4 and 5, the outer surface 123 of the head 122 has a dimension 145 which maintains the inlet 43 in a sealed condition over a predetermined desired range of movement of the spool 58.

The filter assembly 164 is positioned in the lower portion 44 of the brew chamber assembly. An aperture 147 is formed through the filter assembly 164 and is sized and dimensioned to allow the base 125 to pass therethrough during the brewing process. Additionally, when the top assembly 42 is removed from the brew chamber assembly 24, the filter assembly 164 can be removed therefrom by sliding the filter assembly 164 upwardly over the outside surface 141 of the base 125 past the necked portion 127 and upwardly over the outside surface 123 of the head 122. As can be seen from the spool 58, 58a, 58b, as shown in FIGS. 7-9, the head 122 and the base 125 of the spool 58 have external dimensions 151, 153, respectively, which are less than or substantially equal to an inside dimension 155 of the aperture 147. Further, it should be noted that the exterior dimension 151 of the head 122 is less than or substantially equal to the exterior dimension 155 of the base 125. As such, the filter assembly 164 can be easily installed or removed by simply moving it over the spool 58.

Figure 2:
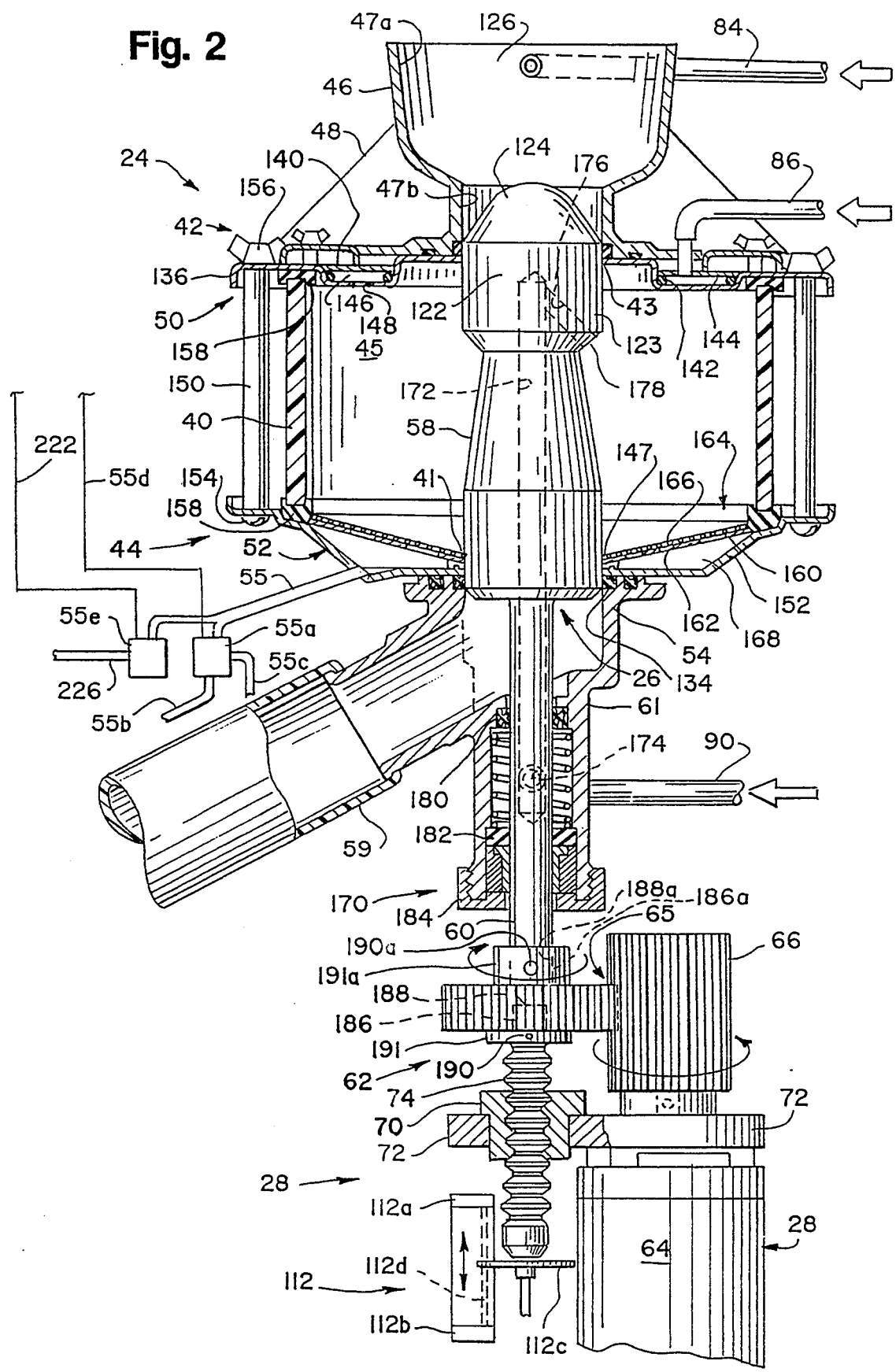
FIG. 2 is a partial fragmentary cross sectional side elevational view of a brew chamber assembly of the beverage brewing apparatus.

As shown in the cross section of FIG. 2, the spray manifold assembly 50 includes a circular manifold plate 136 in which is formed a distribution channel 138 and a channel covering ring 140 which sealably covers the distribution channel 138 with an inside and an outside O-ring 142, 144, respectively. A gap 146 is formed between the channel cover ring 140 and the bottom of the distribution channel 138. The brew line 86 extends through the channel cover ring 140 and communicates with the gap 146 to distribute water throughout the distribution channel 138. Water is distributed over the beverage brewing substance through a series of manifold apertures 148 formed through the distribution channel 138. As will be seen in FIG. 4, water flowing through the manifold apertures 148 is distributed generally evenly over the surface of the beverage brewing substance retained in the brew chamber assembly 24 to maximize the infusion of such substance.

Rod members 150 extend between the manifold plate 136 and a basket member 152 of the filter assembly 52. The rod members 150 have a head 154 at one end and threadedly engage a wingnut 156 at the other end. This arrangement sealably clamps the housing member 40 between the manifold plate 136 and the basket member 152. A seal is effected by sealing members 158 positioned between edges of the housing member 40 and corresponding surfaces of the manifold plate and the basket member 152.

A structural sieve 160 is cooperatively retained in the basket member 152 of the filter assembly 52 for supporting an overlying cover filter material 164. Perforations 162 are formed through the structural sieve 160 to permit fluids to pass therethrough. Pores 166 extending through the filter material 164 permit fluid to pass therethrough and subsequently through the perforations 162 formed through the structural sieve 160. It should be noted that the perforations 162 and the pores 166 shown in FIGS. 2-5 have been exaggerated for illustrative purposes. Fluid which passes through the filter material 164 and the structural sieve 160 collects in a collection space 168 formed between the structural sieve 160 and the basket member 152. Fluid collected therein flows through the dispensing line 55b and into an appropriate collection container 57.

A "Y"-intersection is formed in the drain body between the exhaust tube 59 and the piston housing 61. The downwardly oriented direction of the exhaust tube 59 promotes the flow of spent brewing substance out of the brew chamber 45 during the flushing phase of the brew cycle. The shank portion 60 of the piston assembly passes through a sealed chamber 170 in the piston housing 61. The sealed chamber 170 is sealed at a top end and a bottom end.

The sealed chamber 170 forms a displacable coupling with the flush water line 90 to permit water to flow from the flush water line 90 through a flush water bore 172 formed generally coaxial with the central axis 56 extending through the piston assembly 26. Flush water flowing from the flush water line 90 flows into the sealed chamber 170 and through an inlet aperture 174. Water flows through the flush water bore 172 upwardly towards the enlarged head 122 and is forced through a downwardly directed port 176 formed on an underside of the enlarged head 122 and out through a nozzle 178 attached to the end of the port 176. A top gasket and a bottom gasket 180, 182, respectively form a seal between the sealed chamber 170 and the shank portion 60 and prevent leaking while the piston assembly 26 is rotated and axially displaced by the drive apparatus 28. A bottom portion of the piston housing 61 is sealed by a cap member 184 threadedly retained thereon.

FIG. 2 provides further detail as to the configuration and operation of the drive apparatus 28. As shown, the lead screw 62 has a male portion 186 which couples with a recess 188 formed in the operating gear 68. A pin 190 projecting through a collar 191 retains the lead screw 62 in engagement with the operating gear 68. Similarly, the shank portion 60 has a male portion 186a which couples with a recess 188a in an opposite side of the operating gear 68. A pin 190a projecting through a collar 191a retains the shank portion 60 in engagement with the operating gear 68. The lead screw 62 threadedly engages the acme nut 70 which is securely retained on the mounting member 72.

Referring now to FIGS. 3-5, the function of the present invention during the brewing operation is discussed. As shown in FIG. 3, upon activation of the brewer 20 at the control panel 245, the controller 96 signals the motor 64 of the drive apparatus 28 over line 110 to downwardly displace (as indicated by arrow 201) the spool portion 58 to displace the enlarged head portion 122 from the throat 43 to open the throat for receiving a quantity of beverage brewing substance (as indicated by particles 53a) to be disposed into the funnel portion 46 and pass into the brew chamber 45. A variety of substances may be dispensed by the substance dispensers 22 to produce a desired beverage having a mixture of substances as discussed hereinabove. The controller operates the necessary substance dispensers 22 to dispense the substances necessary to achieve the desired beverage selected by the user at the control panel 245.

The controller 96 next signals the discharge valve 55a over line 55d to close the waste line 55c and the rinse water valve 82a over line 102. Dispensing line 55b is normally closed and therefore does not need to be closed at this point of the brewing operation. The controller also signals the brew water valve 80 over line 108 to dispense a predetermined quantity of heated water. Use of both the rinse line 84 and the brew water line 86 expedites the step of dispensing prefill or floating water into the chamber.

The rinse water line 84 will dispense water at a higher pressure than the brew water line 84 since the brew water line 84 pressure is limited by the flow control valve 82d. The higher pressure rinse water acts to flush the particles 53a out of the funnel portion 46 and down through the throat 43 into the brew chamber 45. Further, the rinse water washes particles off of the enlarged head portion 122 and the domed surface 124 thereby providing a better seal between the gasket 130 and the enlarged head portion 122 when the spool 58 is upwardly displaced. The rinse water, brew water, and the beverage brewing substance 53a collect in the filter assembly 52 with the substance 53a floating on the heated water.

As shown in FIG. 4, the spool 58 is moved upwardly (as indicated by arrow 206) to seal the throat 43 formed through the chamber top assembly 42. Note also, that the drain hole 41 formed through the chamber bottom assembly 44 is sealed by the spool portion 58 at this point in the brew cycle. Sealing the brew chamber at the top and bottom prevents the escape of steam during the steeping step.

Control of the steeping time allows for controlled variable extraction of oils and sediments from the brewing substance providing predetermined brewed beverage results. For example, a smaller quantity of brewing substance which is allowed to steep for a longer period of time may produce the same quantity and intensity of brewed beverage as would a greater quantity of brewing substance which is not allowed to steep.

After a predetermined period of time, or pause, the steeping step is concluded and the brewing process continues. Water is introduced through the inlet line 78 and dispenses water into the heated water reservoir 76 to displace the heated water retained therein once the brew water valve 80 is opened. Water displaced from the heated water reservoir 76 flows through the brew water line 86 and flows through the gap 146 formed between the distribution channel 138 and the channel cover ring 144. Brew water flows through the gap 146 and is dispersed over the beverage brewing substance 53a upon flowing through the plurality of annularly arranged manifold apertures 148 formed through the distribution channel 138. The circle of manifold apertures 148 generally evenly distribute the brew water thereby assuring that all of the beverage brewing substance is thoroughly infused with brewing water to maximize the efficiency of the brewing operation. The discharge valve 55a is selectively controlled to open a path through the dispensing line 55b for a predetermined period of time as set at the controller 96.

Once the beverage brewing substance 53a is infused, a brewed beverage (as indicated by arrows 53) flows through the pores 166 formed through the cover filter material 164 and through the perforations 162 formed through the structural sieve 160. The brewed beverage 53 collects in the collection space 168 and flows into the discharge tube 55 and through the discharge valve 55a, the dispensing line 55b and into the container 57.

Of course, the large quantity brewing feature may be utilized to brew larger quantities of a brewed beverage. As discussed hereinabove, the user may select a larger quantity of a desired beverage and the controller 96 will operate the indexing means 246 and the means for connecting and disconnecting 50 the coupling 242 to provide an automated production of large quantities of a brewed beverage. Of course, the user can select only a single remote container 236 of a brewed beverage and as such may manually couple or disconnect the coupling 242 to the remote container 236. Whether the coupling 242 is attached manually or automatically, the controllable valve 55e will operate to direct the flow through the discharge line 55 into the large quantity line 226 to dispense the large quantity of brewed beverage into the remote beverage container 236.

After the brewing process is completed, the next step is to flush the brew chamber 45 with water to remove the spent beverage brewing substance 53a therefrom and scrub the brew chamber. As a first step, at the completion of the brewing cycle the controller 96 signals the valve 55a to close both the dispensing line 55b and the waste line thereby preventing flush water from the flush cycle from draining through the discharge tube 55.

At the end of the flush cycle, a quantity of coldwater is introduced through the spool 58 via the line 90 to break the vacuum created inside of the chamber by the unheated water used during the flush cycle. The additional cold water breaks the vacuum by slightly increasing the internal pressure. By increasing the internal pressure, the seals between the piston at the throat are easily uncoupled and therefore makes breaching the vacuum easier.

Next, the spool 58 is raised (as shown in FIG. 5) to open the drain 41 an allow a substantial portion of the slurry of the spent brewing substance and remaining brewing water to flow out through the exhaust tube 59. Shortly before the opening of the drain 41, the controller 96 signals the brew water valve 80 to close and terminate the flow of brewing water therethrough.

Next, the flush water valve 82b which initiates the flow of water through the flush water line 90 and out through the bore 178 formed in the spool 58. The spool 58 is rotated while the flush water is flowing therethrough to quickly rinse the chamber while the spool 58 is in the raised position. Water from this flush step is allowed to drain. The flush water is terminated by closing the flush water valve 82b and the spool 58 is lowered to seal the drain 41 and open the throat 43.

A floating flush step is initiated by introducing water into the chamber by means of the brew water, rinse water, and flush water lines, 84,86,90, respectively. Because both paths 55b,55c through the valve 55a and the drain hole 41 are sealed, the incoming water accumulates in the chamber 45. As a result of the accumulation of water in the chamber 45, the spent brewing substance is floated off of the filter material thereby preventing clogging of the pores in the filter material.

When the flush water valve 82b is opened water flows through the flush water line 90 into the sealed chamber 170 and up through the flush water bore 172. Water flows from the bore 178 and onto the inside surface 214 of the housing member 40 for rinsing and removing beverage brewing substance 53a and other matter therefrom. Additionally, the spray of water from the bore 178 is directed towards the inside surface 214 which results in driving the floating brewing substance 53a towards the center of the brewing chamber 45 where it flows down the drain hole 41 without clinging to any of the surfaces of the brewing chamber 45. The bore 178 as used in the present invention provides at least a 90° spray angle so that the water flushes the top edge of the inside surface 214 of the housing member 40. Further, because the spool portion 58 rotates (as indicated by arrow 216) about the central axis 56, a single bore 178 may be employed to spray the entire brew chamber 45 during the flushing operation. It should be noted, however, that multiple bores 178 or nozzles may be used to further enhance the flushing operation.

As the spool 58 rotates and emits a spray of flush water, it moves upwardly to a position just before it unseals from the drain 41. In this position the spool 58 begins to rotate at high speed while it continues to emit flush water. Flow from the rinse and brew water lines 84,86 are terminated. The rapid rotation of the of the spool 58 and the spray of flush water being emitted therefrom induce the accumulated water to swirl within the chamber and agitate any material free from the filter material as well as scrub clean the interior surfaces of the chamber. This dramatic swirling and agitation action continues for a period of approximately 2 or 3 seconds before the spool 58 is finally raised to the point at which it unseals from the drain 41. Once unsealed from the drain 41, the spool 58 continues to rotate for a brief period of time.

The spool 58 is moved upwardly (as indicated by arrow 210) as shown in FIG. 5 for moving the enlarged head portion 122 upwardly through the throat 43 thereby disengaging a lower portion 212 of the spool 58 from the drain hole 41. Once the drain hole 41 is opened, the accumulated water swirling in the chamber under the influence of the rotating spool 58, including the spent brewing substance 53a which was floated or agitated off of the filter material, flows out of the brewing chamber 45 through the drain hole 41.

The beverage brewing substance 53a is flushed through the exhaust tube 59 and into the waste sump 63. 160. Waste water (as indicated by arrows 218 in FIG. 5) which flows through the filter assembly 52 flows into the discharge tube 55. Because it would be highly undesirable to have waste water flowing into the freshly brewed beverage or into the collection container area, the discharge valve 55a is selectively controlled to maintain the path through the dispensing line 55b closed and to open the path through the waste line 55c.

After the spool 58 is moving upward, spool 58 continues to spray flush water for at least another rotation to provide a final rinse of chamber. At the completion of the flushing cycle, the lower portion 212 of the spool portion 58 is sealably seated in the drain hole 41.

The spool 58 is axially displaced as well as rotated during the flushing cycle because of the thread arrangement on the lead screw 62. The lead screw 62 and the acme nut 70 are essentially self cleaning and therefore this arrangement is not susceptible to build up of foreign matter as does the prior art.

When cleaning or repairing the filter assembly 164, the top assembly 42 is removed from the brew chamber 24. With the top assembly 42 removed, the filter assembly 164 may be lifted upwardly off of the bottom assembly 44 and along the spool 58. Since the aperture 147 of the filter assembly 164 has an internal dimension 155 which is greater than or substantially equal to the corresponding exterior dimensions 155, 151 of the base 125 and the head 122, the filter assembly 164 may be removed from the apparatus without removing or disengaging the spool 58.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A method of brewing large quantities of a brewed beverage with an automatic beverage brewing apparatus, preventing beverage brewing substances from becoming lodged in a brewing filter in said automatic beverage brewing apparatus, and for selectively combining two or more substances for brewing, flavoring, and mixing a beverage brewed using means for brewing a beverage by infusing at least one beverage brewing substance with heated water; said automatic beverage brewing apparatus including an automatic beverage brewer having a brewing chamber, a water distribution system communicating with said brewing chamber, and a plurality of substance dispensers operatively associated with said brewing chamber for dispensing substances into said brewing chamber, said brewing chamber being positioned for controllably receiving a selected quantity of a selected type of beverage brewing substance and infusing water during a brew cycle upon activating said automatic beverage brewer;

said brewing filter being disposed in said brewing chamber for retaining a beverage brewing substance thereon during a brewing cycle and separating a brewed beverage produced therefrom; a water line communicating with said brewing chamber for delivering a predetermined quantity of water to said brewing chamber;

multiple remote beverage containers removably associated with said automatic beverage brewing apparatus, said multiple remote beverage containers having a capacity on the order of 1 gallon and being independent from said automatic beverage brewer; and means for providing a beverage path from said automatic beverage brewer to said at least one of said multiple remote beverage containers, said beverage path means having a first end communicating with said automatic beverage brewer for receiving a brewed beverage from said automatic beverage brewer and a second end removably attaching to at least one of said remote beverage containers for receiving a brewed beverage brewed by said automatic beverage brewer through said beverage path means;

the method of brewing a brewed beverage including the steps of:
    selecting a type of beverage to be brewed;
    selecting a quantity of the selected beverage to be brewed;

dispensing a quantity of water into said brew chamber prior to dispensing a brewing substance therein, said quantity of water being sufficient to thoroughly wet said filter and less than a quantity required to infuse a selected quantity of beverage brewing substance;

dispensing a selected quantity of substance from a first one of said substance dispensers into said brewing chamber onto said wetted filter for flavoring and mixing a brewed beverage;

dispensing a selected quantity of substance from at least a second one of said substance dispensers into said brewing chamber onto said wetted filter for flavoring and mixing a brewed beverage;

positioning at least one of said multiple remote beverage containers within a predetermined distance relative to said automatic beverage brewer;

attaching said beverage path means to at least one of said remote beverage containers;

initiating a brew cycle in said automatic beverage brewer to brew the selected quantity and type of beverage therein;

infusing said substances in said brewing chamber for producing a brewed beverage; and disconnecting said beverage path means from said remote beverage container.

2. A method of brewing large quantities of a brewed beverage with an automatic beverage brewing apparatus, said automatic beverage brewing apparatus including an automatic beverage brewer, said automatic beverage brewer controllably brewing a selected quantity of a selected type of brewed beverage during a brew cycle upon activating said automatic beverage brewer;

multiple remote beverage containers removably associated with said automatic beverage brewing apparatus, said multiple remote beverage containers having a capacity on the order of 1 gallon and being independent from said automatic beverage brewer; and means for providing a beverage path from said automatic beverage brewer to said at least one of said multiple remote beverage containers, said beverage path means having a first end communicating with said automatic beverage brewer for receiving a brewed beverage from said automatic beverage brewer and a second end removably attaching to at least one of said remote beverage containers for receiving a brewed beverage brewed by said automatic beverage brewer through said beverage path means;

the method of brewing large quantities of brewed beverage including the steps of:

selecting a type of beverage to be brewed;

selecting a quantity of the selected beverage to be brewed;

positioning at least one of said multiple remote beverage containers within a predetermined distance relative to said automatic beverage brewer;

attaching said beverage path means to at least one of said remote beverage containers;

initiating a brew cycle in said automatic beverage brewer to brew the selected quantity and type of beverage therein; and disconnecting said beverage path means from said remote beverage container.

3. A method of brewing large quantities of a brewed beverage as recited in claim 2, wherein said beverage brewing apparatus further includes indexing means for indexing said multiple remote beverage containers relative to said automatic beverage brewer and means for connecting and disconnecting said beverage path means and at least one of said multiple remote beverage containers;

said method further including the additional steps of:

operating said indexing means for indexing one of said multiple remote beverage containers into position for connection with said beverage path means;

operating said connecting means for connecting said beverage path means with said remote beverage container;

dispensing a brewed beverage from said automatic beverage brewer to said remote beverage container through said beverage path means;

operating said connecting means at the end of a brew cycle for disconnecting said beverage path means from said remote beverage container;

indexing said remote beverage container which has been filled with a brewed beverage away from said disconnected beverage path means;

indexing another of said multiple remote beverage containers into position relative to said beverage brewer for connection with said beverage path means.

4. A method of breaking a vacuum created in a brewing chamber of an automatic beverage brewing apparatus during a rinsing cycle, said brewing chamber being positioned in said automatic beverage brewing apparatus for brewing and dispensing a brewed beverage; a brew line communicating with said brewing chamber for delivering heated water to said brewing chamber to infuse a brewing substance during a brewing cycle; a rinse line communicating with said brewing chamber for delivering unheated water to said brewing chamber; said brewing chamber being rinsed with water from said rinse line after brewing a quantity of brewed beverage during a flush cycle; and control means for controllably dispensing selected quantities of water through said brew line;

said method including the step of:

activating said control means at the end of a flush cycle to controllably dispense a predetermined quantity of heated water from said brew line into said brewing chamber, said quantity of heated water being sufficient to increase the temperature in said brewing chamber and equalize the pressure reduction therein during the flush cycle for breaking the vacuum created in the brewing chamber.

5. A method for selectively combining two or more substances for brewing, flavoring, and mixing a beverage brewing using means for brewing a beverage by infusing at least one beverage brewing substance with heated water, a plurality of controllable substance dispensers operatively associated with said beverage brewing means for controllably dispensing a substance into said beverage brewing means, each of said plurality of controllable dispensers container at least one substance, and means for selectively controlling said plurality of said controllable dispensers, said control means being coupled to each of said plurality of controllable dispensers and selectively dispensing a predetermined quantity of substance from at least two of said controllable dispensers for producing a predetermined selected beverage; said method comprising the following steps of:

dispensing a selected quantity of substance from a first one of said substance dispensers into said beverage brewing means for flavoring and mixing a brewed beverage;

dispensing a selected quantity of substance from at least a second one of said substance dispensers into said beverage brewing means for flavoring and mixing a brewed beverage;

infusing said substances in said beverage brewing means for producing a brewed beverage.

6. A method for selectively combing two or more substances for brewing, flavoring, and mixing a brewed beverage as recited in claim 5, further including the step of:

dispensing a selected quantity of substance from a third one of said substance dispensers after dispensing and infusing substances from said first and second ones of said substance dispensers.

7. A method of brewing a brewed beverage with an automatic beverage brewing apparatus, said method preventing beverage brewing substances from becoming lodged in a brewing filter in said automatic beverage brewing apparatus, said beverage brewing apparatus including a brew chamber, said filter being retained in said brew chamber, means for delivering brewing water to said brew chamber during a brewing cycle, means for providing a beverage path from said chamber to a beverage container, and means for controllably dispensing a quantity of water into said brew chamber prior to dispensing of a brewing substance therein, said method comprising the steps of:

dispensing a quantity of water into said brew chamber prior to dispensing a brewing substance therein, said quantity of water being sufficient to thoroughly wet said filter and less than a quantity required to infuse a selected quantity of brewing substance; and dispensing a selected quantity of brewing substance into said brew chamber.

8. A method of equalizing pressure reduction in a beverage brewing apparatus, which pressure reduction occurs during removal of a spent beverage brewing substance from said apparatus, said apparatus including a brew chamber, a brew line communicating with said brew chamber for delivering heated water to said brew chamber to infuse a brewing substance therein during a brewing cycle, a rinse line communicating with said brew chamber for delivering unheated water to said brew chamber for rinsing the brew chamber after brewing a beverage, said method comprising the steps of:

dispensing a quantity of heated water through said brew line for infusing a brewing substance during a brewing cycle; flushing the spent beverage brewing substance from said brew chamber; closing said brew chamber for further rinsing; dispensing a quantity of water through said rinse line, which water having a temperature which is lower than water dispensed through said brew line; dispensing a quantity of heated water through said brew line to said brew chamber sufficient to increase the temperature of the brew chamber and equalize pressure reduction therein created by flushing said brew chamber with water from said rinse water line.

* * * * *